United States Patent
Brooksby

(10) Patent No.: US 7,142,643 B2
(45) Date of Patent: Nov. 28, 2006

(54) METHOD AND SYSTEM FOR UNIFYING PHONEBOOK FOR VARIED HEARING DISABILITIES

(75) Inventor: Scot Lorin Brooksby, Highland, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 11/015,065

(22) Filed: Dec. 17, 2004

(65) Prior Publication Data

US 2006/0133583 A1   Jun. 22, 2006

(51) Int. Cl.
*H04M 11/00* (2006.01)

(52) U.S. Cl. ..................... 379/52; 379/355.03

(58) Field of Classification Search .................. 379/52, 379/93.15, 90.01, 355.03
See application file for complete search history.

(56) References Cited

U.S. PATENT DOCUMENTS

| | | | |
|---|---|---|---|
| 5,432,837 A | 7/1995 | Engelke et al. | |
| 5,521,960 A | 5/1996 | Aronow | |
| 5,604,786 A | 2/1997 | Engelke et al. | |
| 5,710,806 A | 1/1998 | Lee et al. | |
| 5,978,014 A | 11/1999 | Martin et al. | |
| 6,389,114 B1* | 5/2002 | Dowens et al. | 379/52 |
| 6,658,264 B1* | 12/2003 | Irvin | 379/355.02 |
| 2004/0185800 A1 | 9/2004 | Van Bosch et al. | |
| 2005/0129185 A1* | 6/2005 | McClelland et al. | 379/52 |
| 2005/0190893 A1* | 9/2005 | Stephens et al. | 379/52 |

* cited by examiner

*Primary Examiner*—Stella Woo
(74) *Attorney, Agent, or Firm*—TraskBritt

(57) ABSTRACT

A network device, relay service, system and method for electronic communication between a hearing-capable user and a hearing-impaired user are disclosed, which includes a network device for use by a hearing-impaired user to communicate with a first voice phone of a called or hearing-capable user via a relay service. An electronic phonebook within the network device is configured to store at least one entry that includes a phone number of the first voice phone and a relay service type identifier designating a request for a specific level of interpretive services by said relay service. The phone number and the relay service type identifier are passed to a relay service and the relay service is configured to provide varying levels of interpretive services. A voice carry-over interpretive service is initiated when the relay service type identifier designates a request for the voice carry-over interpretive service.

20 Claims, 6 Drawing Sheets

METHOD AND SYSTEM FOR UNIFYING PHONEBOOK FOR VARIED HEARING DISABILITIES

BACKGROUND OF THE INVENTION

1. Field of the Invention

The invention relates generally to the field of communications for the hearing impaired, and, more particularly, to intelligent electronic phonebook entries in a communication device utilized by hearing impaired users.

2. State of the Art

It is apparent that many individuals with significant hearing loss are not able to communicate effectively over conventional telephone systems that rely upon voice communications. Since the early 1960's, devices have been available for facilitating the communication between hearing and hearing-impaired users.

The hearing-impaired user would utilize a teletypewriter (TTY) to communicate over the telephone lines. Such devices, known as TDD's or Telephone Devices for the Deaf are configured to allow a hearing-impaired user to type a message on a keyboard that is then sent to the receiving user. Upon receipt of the coded signal, the signal is decoded and displayed on a message terminal. The receiving party may thereafter respond using a similar procedure. It should be apparent that such a communication approach is slow and cumbersome. Standardized methodologies have been developed for enabling a hearing-impaired user equipped with a TDD to communicate telephonically with normal hearing individuals not equipped with an equivalent device. To provide such a capability, relay services have been established and staffed with interpreters equipped to receive phone calls from either the hearing-impaired user as initiated using a TDD or from a hearing-capable user using conventional voice telephony. The relay interpreters function is to establish a communication session between the calling and called parties and to thereafter serve as an interpreter between the users. In a typical conversation utilizing the relay services, the hearing-impaired user enters keystrokes which in turn send a message to the relay services interpreter who then voices the received text-based message to the hearing party over a voice-based communication channel. A hearing-capable user thereupon may voice a response to the relay services interpreter who in turn enters keystrokes which form a text based message which is delivered to the hearing-impaired user and presented on the TDD device. Such a process continues for the duration of the conversation or communication session.

While TDD devices facilitate communication with at least one hearing-impaired user, they're limited in fulfilling various needs of hearing-impaired users and more particularly in providing communication options for hearing-impaired individuals having varying degrees of impairment. For example, a hearing-impaired individual, while being impaired as to the hearing or receiving of audio signals, may in fact be capable of generating adequate voice communication that is adequately intelligible so as to be comprehended by a hearing-capable party. In fact a significant number of hearing-impaired individuals have the ability to intelligibly speak but their hearing is inadequate for conventional communications over voice telephony. For efficiency as well as other reasons, such speech-capable hearing-impaired individuals regularly desire to converse using voice-based responses.

Extensions of relay services have included the development of voice bridges known as "Voice Carry-Over" (VCO) which enable the voice-capable hearing-impaired individual to speak directly to the hearing party. In such an application, the relay service interpreter is instructed that the hearing-impaired user desires the formation of the voice bridge or conferencing of the voice-capable hearing-impaired user's voice. In such a service configuration, once the conference call is established, the relay service interpreter is employed only for the conversion of the voice portion of the call that is to be delivered to the hearing-impaired user. It should be apparent that not all hearing-impaired individuals have adequate or intelligible speech capabilities for utilization of a relay service configured to provide VCO services. However, such an arrangement does provide a more efficient method of communication between a voice-capable hearing-impaired user and another individual. Therefore, the VCO interpretive service has become a conventional feature in most relay services.

As stated, hearing-impaired individuals have differing capacities for hearing and speaking. Additionally, households or institutions may have hearing-impaired users of differing capacities which utilize or share common equipments. Therefore, there is a need to enable the configuration of equipments to specify or request varying levels of relay services as initiated from a common or shared communication device.

BRIEF SUMMARY OF THE INVENTION

A method and system for associating various levels of interpretive services with entries in an electronic phonebook for hearing-impaired users of varying impairment. In one embodiment, a network device for use by a hearing-impaired user to communicate with a first voice phone of a called user via a relay service is provided. The network device includes an electronic phonebook configured to store therein at least one entry which includes a phone number of the first voice phone and a relay service type identifier designating a request for a specific level of interpretive services by said relay service. The network device further includes a control process configured to be responsive to selecting one of the at least one entry from the electronic phonebook and passing the phone number of the first voice phone of the called party and the relay service type identifier of the one of the at least one entry to the relay service.

In another embodiment of the present invention, a relay service for providing a variety of interpretive services between the hearing-impaired user and a hearing-capable user is provided. The relay service includes control logic configured to be responsive to a request for interpretive services including a phone number of a first voice phone of the hearing-capable user and a relay service type identifier designating a request for a specific level of interpretive services. The relay service further includes interpreter services configurable according to the relay service type identifier.

In a further embodiment of the present invention, a communication system for communicating between a hearing-impaired user and a hearing-capable user is provided. The communication system includes a first voice phone for use by the hearing-capable user and a network device for use by a hearing-impaired user. The network device communicates with the first voice phone of the called user and includes an electronic phonebook configured to store therein at least one entry. The entry includes a phone number of the first voice phone and a relay service type identifier designating a request for a specific level of interpretive services. The network device further includes a control process configured to be responsive to selecting one of the entries from the electronic phonebook and passing the phone number of the first voice phone of the called party and the relay service type identifier of the entry. The communication system further includes a relay service coupled via a network to the network device and the first voice phone. The relay service is configured to provide a variety of interpretive services between the hearing-impaired user and the hearing-capable user.

In yet a further embodiment of the present invention, a method for electronic communication with a hearing-impaired user and a called user is provided. An entry is selected from an electronic phonebook within a network device. The entry includes a phone number of the called party and a relay service type identifier. The phone number and the relay service type identifier are passed to a relay service and the relay service is configured to provide varying levels of interpretive services. A voice carry-over interpretive service is initiated when the relay service type identifier designates a request for the voice carry-over interpretive service.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

In a hearing-impaired communication system, hearing-impaired users may exhibit variations in hearing impairment. Therefore, a unified network device may accommodate the communication system with a relay service configured to support interpretive services for voice-incapable hearing-impaired users through the use of a video relay service as well as providing interpretive services for voice-capable hearing-impaired users through the use of a voice carry-over (VCO) relay service. The use of a unified network device for supporting a varied spectrum of hearing impaired users could be streamlined through the use of an electronic phonebook or speed dial list stored therein which may also carry therewith a relay service type identifier specifying the type of relay services requested for each of the entries in the electronic phonebook.

Generally, when entering records or entries into the electronic phonebook or speed dial list of the network device, the user can create a record or entry for specific individuals, a portion of which may include the voice carry-over (VCO) relay service. During call initiation, user may select a record or entry from the electronic phonebook or speed dial list and place a relay service call which passes a stored VCO call back number that has been stored within the network device. While the following embodiments depict a specific configuration of a network device as well as a relay service, such detail is to be interpreted as illustrative and not restrictive of the scope of the invention.

Figure 1:
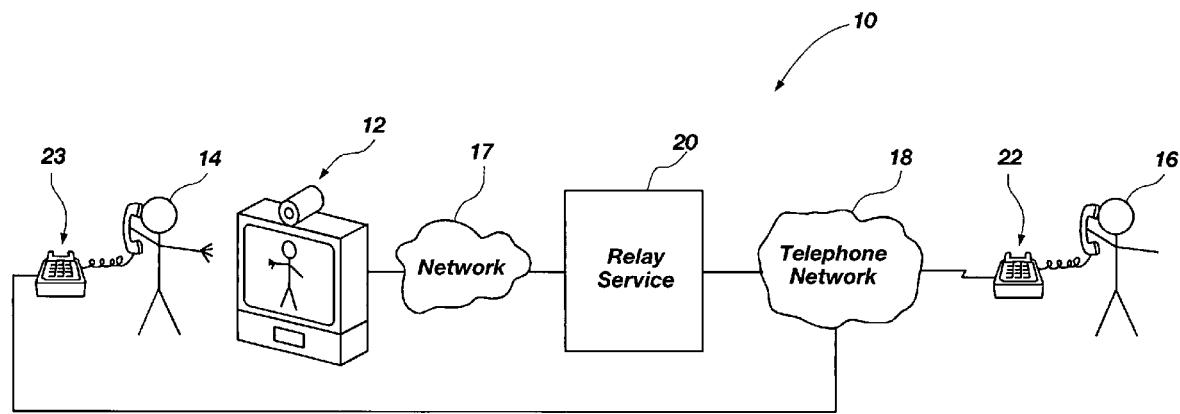
FIG. 1 illustrates a hearing-impaired communication system, in accordance with an embodiment of the present invention.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-impaired user 14 to engage in conversation through a communication system with a hearing-capable user 16. The hearing-impaired user 14 may exhibit varying levels of impairment and may take the form of a voice-capable hearing-impaired user for a voice-incapable hearing-impaired user. As stated, the voice capability of a hearing impaired user may be used to determine the extent of relay services relied upon during a communication session within communication system 10. A communication session between the users is facilitated through the use of various equipments, which are preferably coupled together using one or more networks including a telephone network such as the Public Switch Telephone Network (PSTN). Alternatively, use of the term "telephone network" as used herein also contemplates networks which are compatible and configured to provide communications using digital standards, an example of which includes Voice Over Internet Protocol (VOIP).

To interface a hearing-impaired user into a generally voice-based communication system, interpretive services are employed allowing hearing-impaired users to communicate with an interpreter. If the hearing-impaired user is voice-incapable, then communication with the interpreter occurs primarily through the use of sign language. If the hearing-impaired user is predominantly voice-capable, then communication with the interpreter may be performed by the user expressing themselves through voice signals and "hearing" the interpreter through the use of sign language or other text based interfaces. For voice-incapable hearing-impaired users, the sign language images are translated or interpreted by a relay service 20 providing a level of relay service herein defined as a "video relay service." When the sign language images are translated by the relay service 20 they are forwarded as voice information over a voice-based communication connection to the hearing-capable user 16. One means for relaying the communicative expressions of a voice-incapable hearing-impaired user 14 within hearing-impaired communication system 10 incorporates a network device 12, an example of which is a video phone. The network device 12 captures and displays in video form the communicative expressions exhibited by the voice-incapable hearing-impaired user 14. When user 14 is a voice-capable hearing-impaired user, the network device 12 forwards voice communicative expressions exhibited by the voice-capable hearing-impaired user 14 to the relay service and directly to the hearing-capable user 16. For a voice-incapable hearing-impaired user, the sign language and/or body language may be interpreted or translated by relay service 20. The hearing-capable user 16 interacts in a conventional manner with relay service 20 through the use of voice-based dialog conveyed over a conventional voice phone 22. The various devices, such as network device 12 and voice phone 22, are coupled to relay service 20 using one or more networks 17, 18. By way of example, and not limitation, enhanced bandwidth requirements of various network devices may be better accommodated by providing high bandwidth networks and connections thereto through various enhanced-bandwidth networking technology including DSL, Cable, Ethernet, etc. Network 18 may be implemented according to the standards and bandwidth requirements of voice phone 22 and, as stated, may further be implemented according to digital telephony standards including VOIP.

When the relay services 20 are utilized as a VCO type relay service, a two-line VCO configuration may be employed. In such an arrangement, the network device 12 includes a stored VCO call back number of a voice telephone 23 that is used to form a conference call between an interpreter within the relay service 20, the hearing-capable user 16 and the voice-capable hearing-impaired user 14 through voice phones 22, 23.

Figure 2:
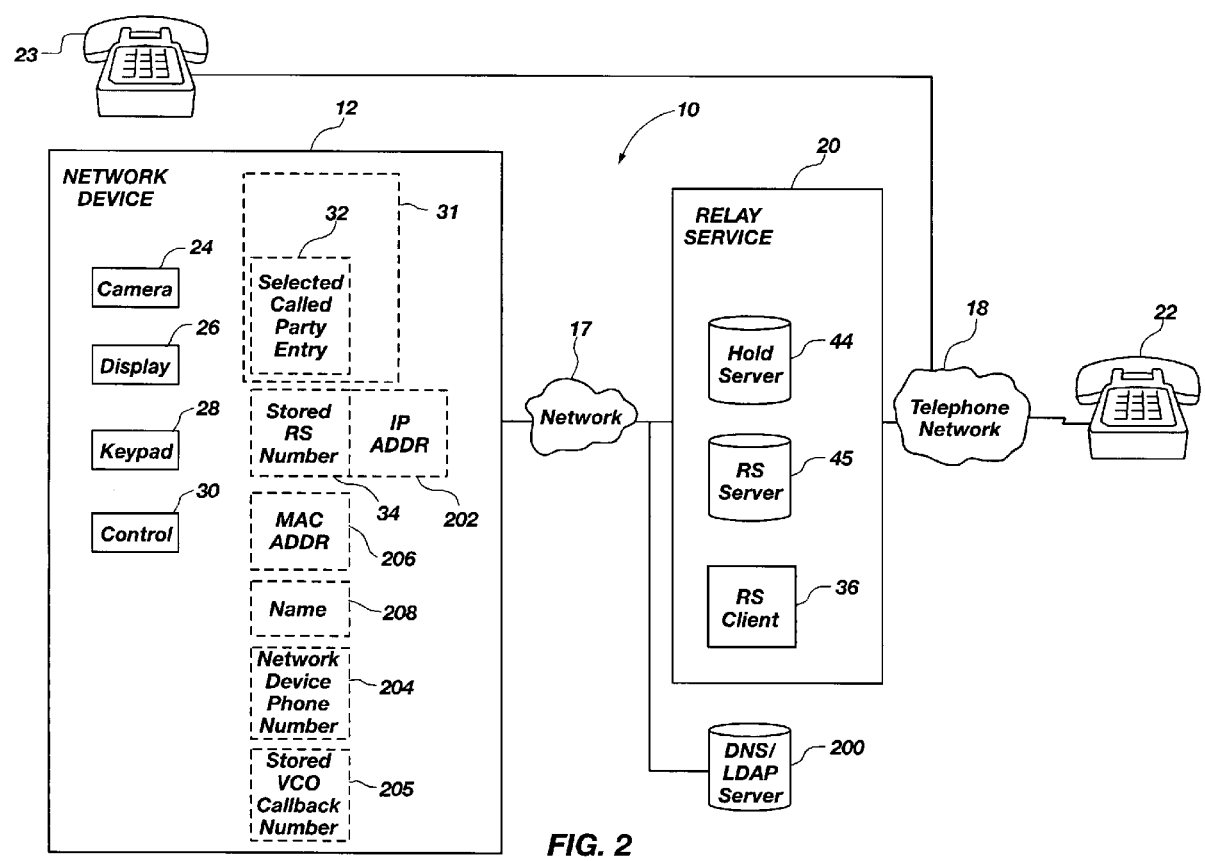
FIG. 2 illustrates a simplified block diagram of a hearing-impaired communication system, in accordance with an embodiment of the present invention.

FIG. 2 is a simplified diagram of a hearing-impaired communication system 10, in accordance with an embodiment of the present invention. To facilitate the interaction with a hearing-impaired user a network device 12, an example of which is a video phone, includes video components such as a camera 24, for capturing the communicative expression of a hearing-impaired user and further includes a display or monitor 26 for displaying the communicative expressions originating from the hearing-capable user as interpreted by a relay service 20. Network device 12 may further include a keypad 28 or other data entry device configured to enable data entry including the data entry of information (e.g. electronic phonebook entries) as well as the ability to enable a hearing-impaired user to initiate a communication session in a conventional manner by entering a telephone number, or selecting a telephone number or other address from an electronic phonebook or speed dial list as stored within the network device 12. When a hearing-impaired user initiates a communication session by selecting an entry from the electronic phonebook 31, entry is designated as a selected called party number 32. In accordance with one embodiment of the present invention, the hearing-impaired user is able to interact with network device 12 to initiate a phone call in a manner consistent with the interaction with a conventional telephone wherein a selected called party number is selected from among one or more entries in an electronic phonebook or speed dial list.

A control process 30 facilitates a storage or population of electronic phonebook 31 as well as the selection of a selected called party number 32 from the electronic phonebook for the initiation of a call. By way of operation, the control process 30 retrieves a stored relay service number 34, which identifies a specific relay service, and using a protocol, such as DNS or LDAP protocol contacts a DNS or an LDAP server 200 and passes thereto a domain name or stored relay service number 34 and requests therefrom a corresponding IP address 202 which is returned to the network device 12. The network device 12 thereafter initiates a call to the relay service 20 over network 17 using, for example, corresponding IP address 202 as returned from the LDAP server 200.

The control process 30 initiates a communication session over network 17 between a network device 12 and the relay service 20. In one embodiment of the present invention, the communication session between network device 12 and relay service 20 is, more specifically, initially connected to a hold server 44 within relay service 20. Hold server 44 communicates with a relay service server 45 and when hold server 44 receives an inbound call in the form of a call request for the establishment of a communication session between network device 12 and relay service 20, hold server 44 notifies relay service server 45 of the intention to establish a communication session between network device 12 and the conventional voice phone 22. During the establishment of the communication session between network device 12 and relay service 20, network device 12 passes a call request which includes the other information present within the selected entry of the selected called party number 32. Included information includes a stored VCO call back number 205 of the selected called party number 32. The call request also includes a relay service type identifier corresponding to the selected called party entry from the electronic phonebook which designates the specific relay service type requested to be performed by relay services 20. The call request may further include a video phone number 204 a MAC address 206, a name 208, a selected called party number 32 and a stored VCO call back number 205 when the relay services type identifier designates a VCO level of service by the relay service 20. The VRS server 45 further includes and maintains a queue for one or more calls originating from network devices 12 seeking to establish or maintain a communication session utilizing interpretive services as provided within relay services client 36. As stated, voice phone 23 provides a separate communication path for the formation of a VCO degree of service.

Figure 3:
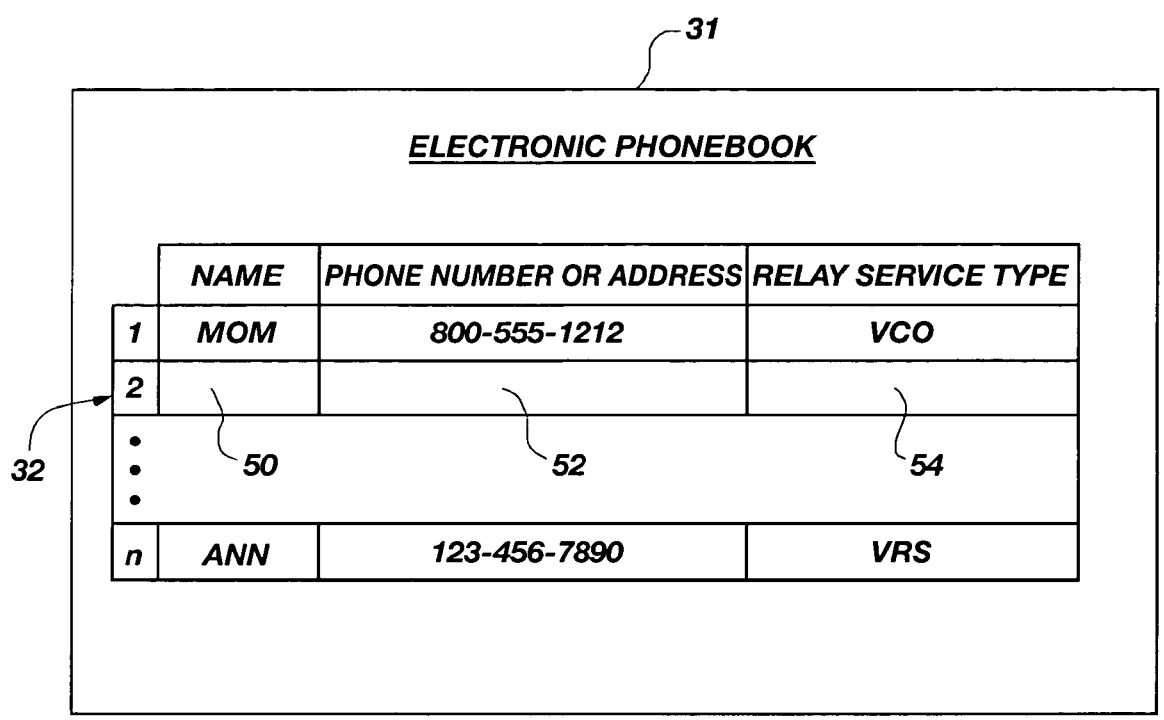
FIG. 3 illustrates an electronic phonebook of a network device, in accordance with an embodiment of the present invention.

FIG. 3 is a diagram of an electronic phonebook or speed dial list, in accordance with an embodiment of the present invention. An electronic phonebook 31 is resident within the network device 12 (FIG. 2) and stores in specific entry a name, number or address, and a requested relay service type for each entry. A typical entry, such as a selected called party number 32 includes a name 50 which may be presented as a string of alphanumeric characters distinguishing a designated or other identifier of a specific entry within the electronic phonebook 31. Associated with the name identifier 50, is a corresponding phone number or address (e.g. IP address) enabling the one or more networks to properly terminate the initiated call. The phone number or address identifier 52 may include a conventional PSTN telephone numbering system such as an area code and telephone number or, alternatively, it may include an IP addressing system for the completion or termination of a communication session over a wide area network, such as the Internet. As stated, a typical entry further includes a relay service type identifier 54 which specifies the level of relay services requested for the specific entry. By way of example, types of relay service type identifiers include video relay services requesting the interpreter of the relay service 20 (FIG. 2) to present sign language over a video phone or other visual based techniques allowing the hearing-impaired user to "hear" the conversation through a visual medium such as sign language or text messaging. An alternate relay service type identifier may include a VCO relay service identifier requesting the formation of a communication session which includes the ability for voice carry over from the voice-capable hearing-impaired user to the hearing-capable user. In such a configuration, the interpreter of relay services 20 forms a conference call allowing the voice communication to be exchanged while the interpreter provides "hearing" to the voice-capable hearing-impaired user through a visual means, such as through the use of a video phone or a text-based messaging system.

Figure 4:
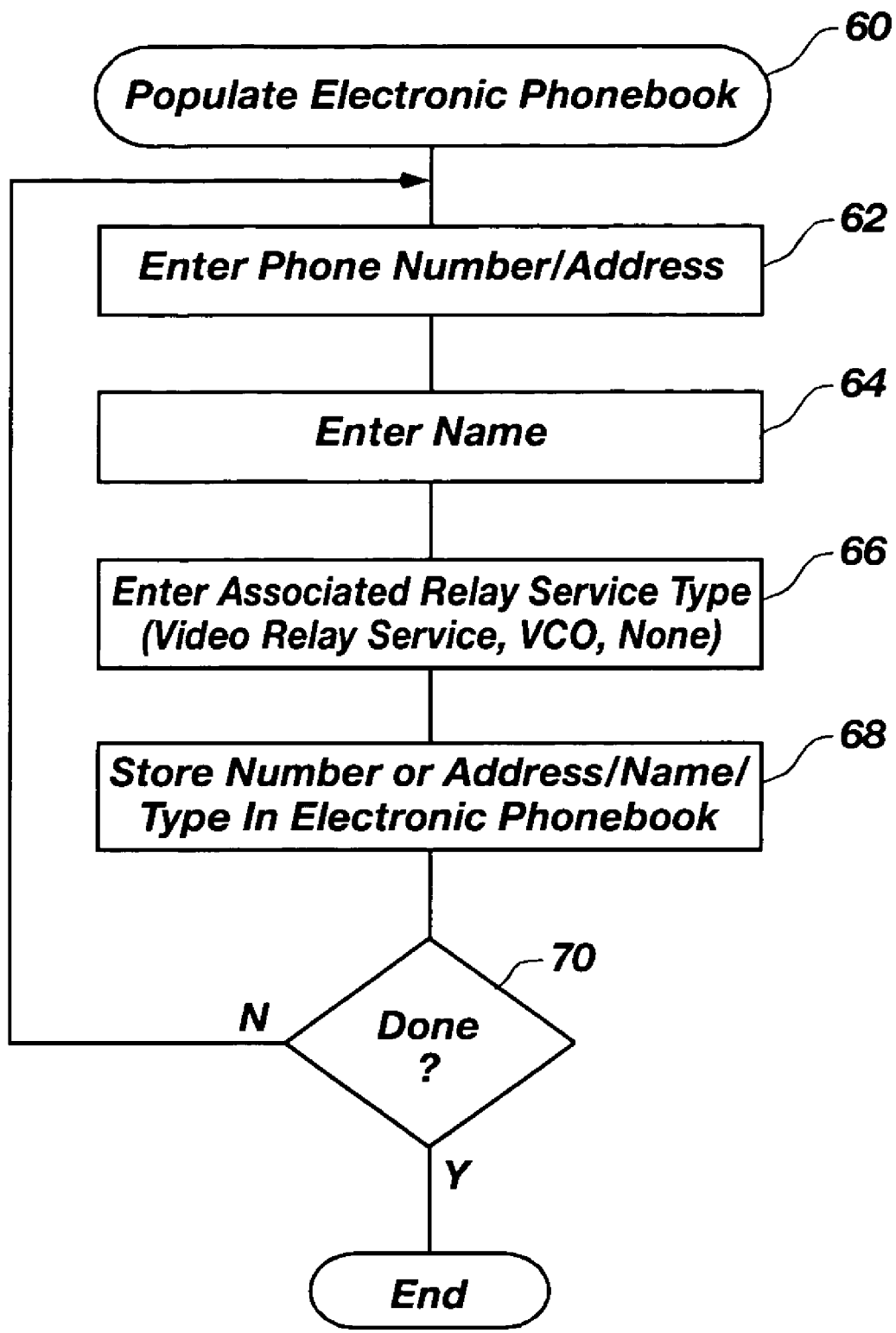
FIG. 4 is a flow chart for populating an electronic phonebook, in accordance with an embodiment of the present invention.

FIG. 4 is a flow chart illustrating the population of entries into an electronic phonebook, in accordance with an embodiment of the present invention. A populated electronic phonebook process 60 allows the hearing-impaired user or other user to enter 62 a phone number or other address identifier and to associate therewith or enter 64 an identifying name. The specific entry of the name and phone number or address has associated 66 therewith a relay service type identifying the level of service of which is to be provided by the relay service. The name, number/address, and type identifier are stored 68 in the electronic phonebook 31 (FIG. 3) and a query 70 determines if more entries are to be processed.

Figure 5:
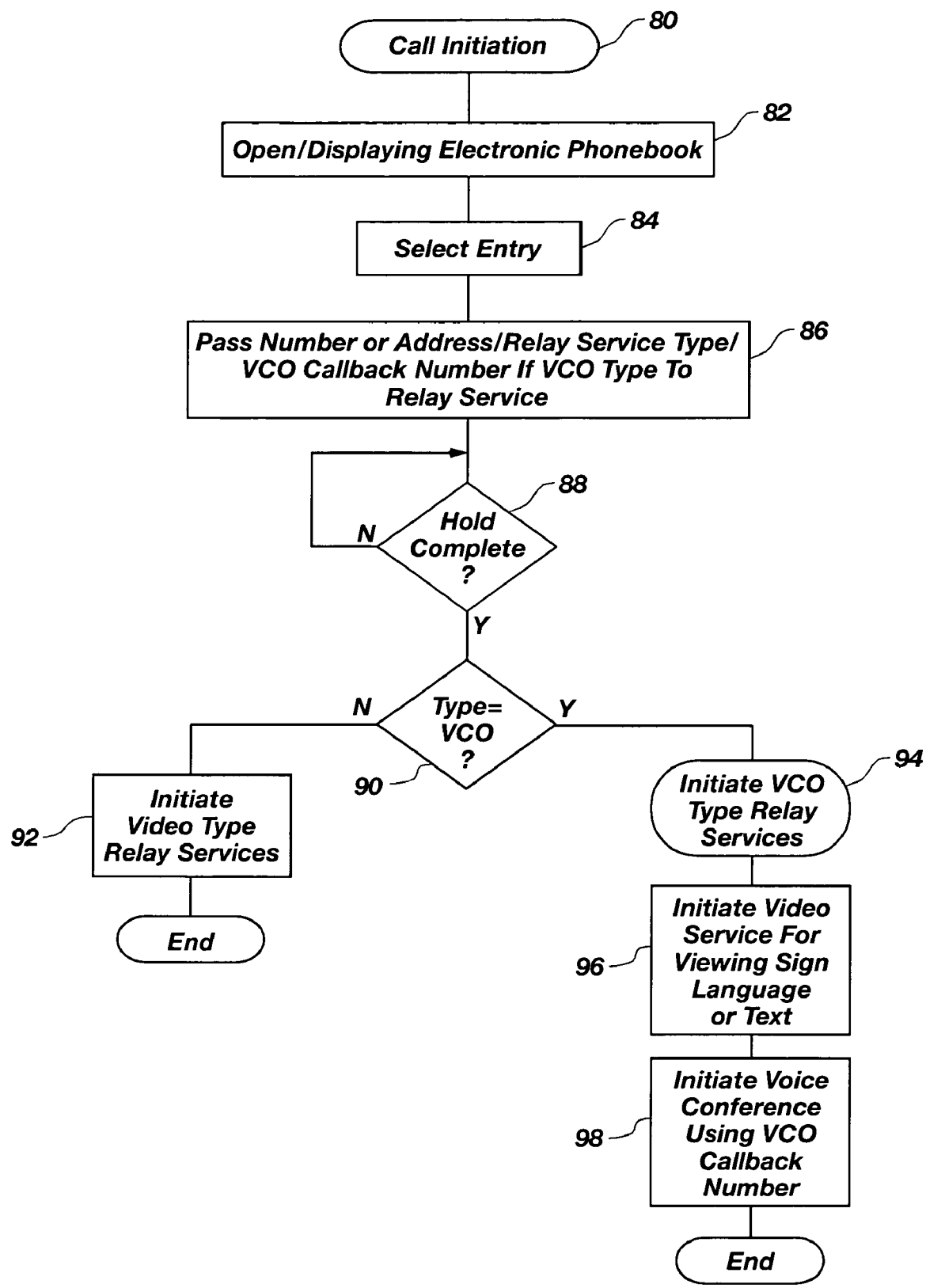
FIG. 5 is a flow chart for initiating a communication session with a network device, in accordance with an embodiment of the present invention.

FIG. 5 is a flow diagram illustrating an initiation of a caller communication session utilizing entries within an electronic phonebook, in accordance with an embodiment of the present invention. A call initiation process 80 commences by opening 82 the electronic phonebook for access by the user. While the electronic phonebook is open, a user selects 84 an entry within the phonebook and initiates the call which passes 86 the number or address, the relay service type, and a VCO call back number 205 (FIG. 2) if the relay service type identifier 54 (FIG. 3) or if the VCO type identifier is configured to select VCO relay services. In a relay service that utilizes a hold server, a hold complete query 88 awaits the availability of interpretive services and when the interpretive services are available a query 90 determines the appropriate type of specified relay services. When VCO relay services are not requested, video type relay services are initiated 92. When VCO type relay services are requested and initiated a VCO type relay services process 94 commences by initiating 96 a video service for viewing sign language or text based interpretive responses from an interpreter. The relay services also initiates 98 an audio or voice based conference with the voice-capable hearing-impaired user using the provided VCO call back number 205 (FIG. 2).

Figure 6:
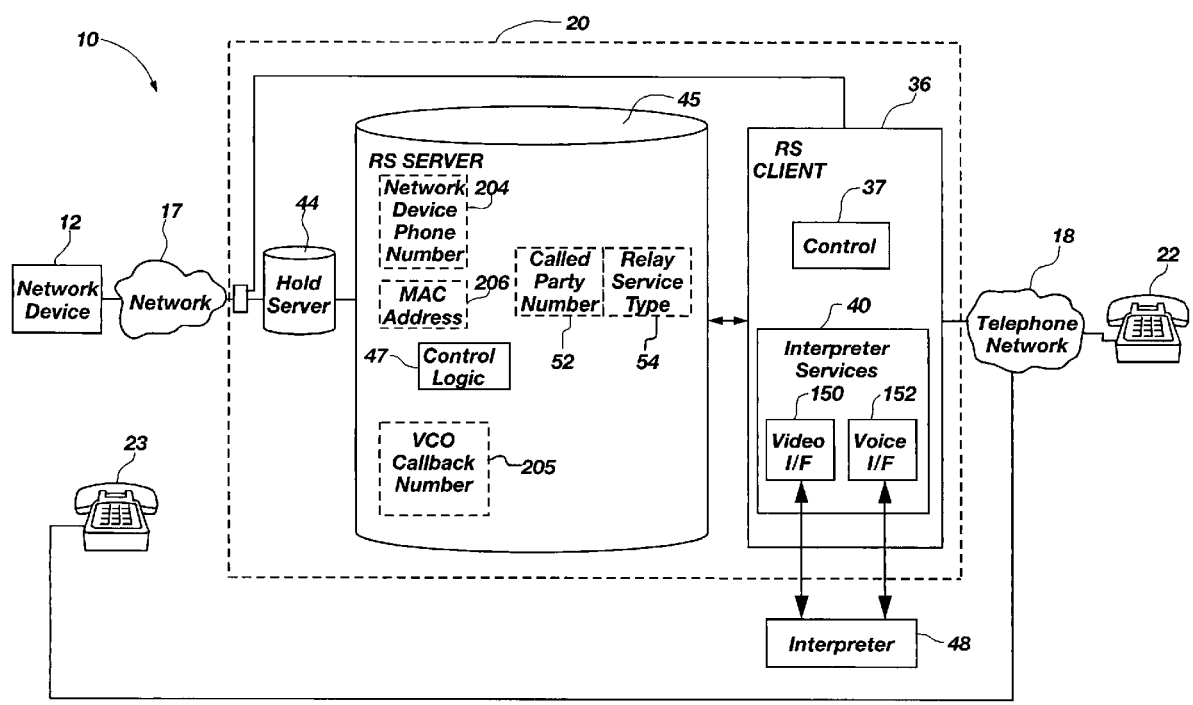
FIG. 6 is a functional block diagram of a relay service configured for operation with a hearing-impaired communication system.

FIG. 6 is a functional block diagram of a hearing-impaired communication system 10 including a relay system, configured in accordance with an embodiment of the present invention. The network device 12 (e.g., videophone) and voice phone 22 interact via relay services 20 and as further coupled via network 17, 18. The relay service 20 provides interconnection and interpretive services between a hearing-impaired user and a hearing-capable user, in accordance with an embodiment of the present invention. During the establishment of a connection between a network terminal 12 and relay services 20, call information including video phone number 204 (e.g., an IP address to connect with when the interpretive services are available following a hold process), MAC address 206, the VCO callback number 205 when the VCO relay services are selected, and the selected called party entry 32 including the phone number/address 52, and relay service type 54 are forwarded according to control logic 47 via hold server 44 to VRS server 45.

The relay surface 20 further includes a VRS client 36, which provides interfaces to both the hearing-capable user at a voice phone 22 via network 18, and an interface with an interpreter 48 through interpreter services 40, which further includes video and voice interfaces 150, 152. The VRS client 36 also establishes a conference call with the voice phone 23 of the voice-capable hearing-impaired user when a VCO relay service is requested. The VRS client 36 notifies the VRS server 45 via control 37 when interpretive services are available. VRS client 36 then receives the call from the hold server 44 when the VRS server 45 determines which call request has priority and then instructs the hold server 44 to transfer the call to the VRS client 36.

What is claimed is:

1. A network device for use by a hearing-impaired user to communicate with a first voice phone of a called user via a relay service, comprising:

an electronic phonebook configured to store therein at least one entry, the at least one entry including a phone number of the first voice phone and a relay service type identifier designating a request for a specific level of interpretive services by the relay service; and a control process configured to be responsive to selecting one of the at least one entry from the electronic phonebook and to pass the phone number of the first voice phone of a called party and the relay service type identifier of the one of the at least one entry to the relay service.

2. The network device of claim 1, further comprising a stored VCO callback number of a second voice phone of the hearing-impaired user.

3. The network device of claim 2, wherein the control process is further configured for passing the stored VCO callback number of the second voice phone of the hearing-impaired user to the relay service when the relay service type identifier designates a request for a voice carry-over interpretive service from the relay service.

4. The network device of claim 1, further comprising a display configured to present one of a video image or text-based image originating from the relay service when the relay service provides relay services of the specific level of interpretive services.

5. The network device of claim 1, wherein the phone number of the at least one entry is a network address of the first voice phone of the called party.

6. A relay service for providing a variety of interpretive services between a hearing-impaired user and a hearing-capable user, comprising:

control logic configured to be responsive to a request for interpretive services including a phone number of a first voice phone of the hearing-capable user and a relay service type identifier designating a request for a specific level of interpretive services; and interpreter services configurable according to the relay service type identifier.

7. The relay service of claim 6, wherein the control logic is further configured to be responsive to a stored VCO callback number of a second voice phone of the hearing-impaired user and establish a voice conference with the hearing-impaired user over the second voice phone and hearing-capable user over the first voice phone.

8. The relay service of claim 6, wherein the control logic is further configured to present one of a video image or text-based image when the interpreter services provides interpretive services of the specific level.

9. The relay service of claim 6, wherein the phone number of the at least one entry is a network address of the first voice phone of a called party.

10. A communication system for communicating between a hearing-impaired user and a hearing-capable user, comprising:

a first voice phone for use by the hearing-capable user;

a network device for use by the hearing-impaired user to communicate with the first voice phone of the hearing-capable user, including an electronic phonebook configured to store therein at least one entry, the at least one entry including a phone number of the first voice phone and a relay service type identifier designating a request for a specific level of interpretive services, the network device further including a control process configured to be responsive to selecting one of the at least one entry from the electronic phonebook and to pass the phone number of the first voice phone of the hearing-capable user and the relay service type identifier of the one of the at least one entry; and a relay service coupled via a network to the network device and the first voice phone, the relay service configured to provide a variety of interpretive services between the hearing-impaired user and the hearing-capable user.

11. The communication system of claim 10, further comprising a second voice phone of the hearing-impaired user and wherein the network device, further comprises a stored VCO callback number of the second voice phone of the hearing-impaired user.

12. The communication system of claim 11, wherein the control process is further configured for passing the stored VCO callback number of the second voice phone of the hearing-impaired user to the relay service when the relay service type identifier designates a request for a voice carry-over interpretive service from the relay service.

13. The communication system of claim 10, wherein the network device further comprises a display configured to present one of a video image or text-based image originating from the relay service when the relay service provides relay services of the specific level of interpretive services.

14. The communication system of claim 10, wherein the phone number of the at least one entry is a network address of the first voice phone of the called party.

15. A method for electronic communication with a hearing-impaired user and a called user, comprising:

selecting an entry from an electronic phonebook within a network device, the entry including a phone number of the called user and a relay service type identifier;

passing the phone number of the called user and the relay service type identifier to a relay service, the relay service configured to provide varying levels of interpretive services; and initiating voice carry-over interpretive service at the relay service when the relay service type identifier designates a request for the voice carry-over interpretive service.

16. The method of claim 15, further comprising displaying the relay service type identifier with the phone number of the called user for selection by the hearing-impaired user.

17. The method of claim 15, further comprising initiating a video relay service at the relay service when the relay service type identifier designates a request for the video relay service.

18. The method of claim 15, further comprising passing a stored VCO callback number of the hearing-impaired user to the relay service when the relay service type identifier designates a request for the voice carry-over interpretive service.

19. The method of claim 18, further comprising initiating a voice conference with the hearing-impaired user according to the stored VCO callback number, the relay service and the called party when the relay service type identifier designates a request for the voice carry-over interpretive service.

20. The method of claim 15, further comprising associating a relay service type identifier with the entry in the electronic phonebook, the relay service type identifier identifying a level of interpretive services requested by the hearing-impaired user.

* * * * *